United States Patent
Ouchi

(10) Patent No.: US 10,447,937 B2
(45) Date of Patent: Oct. 15, 2019

(54) IMAGE PROCESSING APPARATUS, IMAGING APPARATUS, IMAGE PROCESSING METHOD, AND STORAGE MEDIUM THAT PERFORM IMAGE PROCESSING BASED ON AN IMAGE PROCESSING PARAMETER SET FOR A FIRST OBJECT AREA, AND INFORMATION ON A POSITIONAL RELATIONSHIP BETWEEN AN OBJECT IN A SECOND OBJECT AREA AND AN OBJECT IN THE FIRST OBJECT AREA

(71) Applicant: CANON KABUSHIKI KAISHA, Tokyo (JP)

(72) Inventor: Kenji Ouchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 15/708,432

(22) Filed: Sep. 19, 2017

(65) Prior Publication Data
US 2018/0084201 A1 Mar. 22, 2018

(30) Foreign Application Priority Data
Sep. 21, 2016 (JP) .................................. 2016-184564

(51) Int. Cl.
*H04N 5/232* (2006.01)
*H04N 9/04* (2006.01)
*G06T 7/557* (2017.01)

(52) U.S. Cl.
CPC ......... *H04N 5/23296* (2013.01); *H04N 5/232* (2013.01); *H04N 5/23212* (2013.01);
(Continued)

(58) Field of Classification Search
CPC .......... H04N 5/23296; H04N 5/23229; H04N 5/23212; H04N 5/23216; H04N 9/045; G06T 2207/10052; G06T 7/557
See application file for complete search history.

(56) References Cited

U.S. PATENT DOCUMENTS 9,544,572 B2   1/2017   Tsutsumi
9,712,740 B2   7/2017   Tsutsumi
(Continued)

FOREIGN PATENT DOCUMENTS

JP   2016-024489 A   2/2016

*Primary Examiner* — Ahmed A Berhan
(74) *Attorney, Agent, or Firm* — Venable LLP

(57) ABSTRACT

An image processing apparatus includes one or more processors that set a first image processing parameter for each of a plurality of first object areas included in an input image, perform image processing for the input image with a second image processing parameter set based on a plurality of first image processing parameters corresponding to the plurality of first object areas, and select a second object area in the input image. The one or more processors also obtain information on a positional relationship between an object contained in the second object area and an object contained in the first object area, and set the second image processing parameter based on the plurality of first image processing parameters and the information on the positional relationship. The image processing is performed based on the first image processing parameter and the information on the positional relationship, which are stored in a memory.

18 Claims, 8 Drawing Sheets

(52) U.S. Cl.
CPC ..... *H04N 5/23216* (2013.01); *H04N 5/23229* (2013.01); *H04N 9/045* (2013.01); *G06T 7/557* (2017.01); *G06T 2207/10052* (2013.01)

(56) References Cited

U.S. PATENT DOCUMENTS

2016/0021298 A1* 1/2016 Tsutsumi ................ G06T 7/593
 348/349
2016/0127636 A1* 5/2016 Ito ....................... G06F 3/04845
 348/333.12

* cited by examiner

IMAGE PROCESSING APPARATUS, IMAGING APPARATUS, IMAGE PROCESSING METHOD, AND STORAGE MEDIUM THAT PERFORM IMAGE PROCESSING BASED ON AN IMAGE PROCESSING PARAMETER SET FOR A FIRST OBJECT AREA, AND INFORMATION ON A POSITIONAL RELATIONSHIP BETWEEN AN OBJECT IN A SECOND OBJECT AREA AND AN OBJECT IN THE FIRST OBJECT AREA

This application claims the benefit of Japanese Patent Application No. 2016-184564, filed on Sep. 21, 2016, which is hereby incorporated by reference herein in its entirety.

BACKGROUND OF THE INVENTION

Field of the Invention

The present invention relates to an image processing apparatus, an imaging apparatus, an image processing method, and a storage medium, each of which provides image processing for an input image generated through imaging or image capturing.

Description of the Related Art

An image generated through imaging includes a refocus image generated by a refocus process with a captured image, as disclosed in Japanese Patent Laid-Open No. 2016-024489, as well as the captured image generated by the imaging itself. The refocus process is a process that generates the refocus image that artificially varies an object to be focused (in-focus object) after imaging, based on output signals from a plurality of pixels on an image sensor, which photoelectrically convert light that has passed different areas in an exit pupil in an imaging optical system. In this refocus process, image processing is also performed, such as a white balance process, for generating a final high-quality output image.

In the refocus process, an object condition, such as a brightness, may be different between the pre-variation in-focus object and the post-variation in-focus object. In this case, the image processing with the object condition of the pre-variation in-focus object may not provide a wholly high-quality output image. For example, the post-variation in-focus object may have unnatural colors.

SUMMARY OF THE INVENTION

The present invention provides an image processing apparatus, an imaging apparatus, an image processing method, and a storage medium, each of which provides high-quality image processing for an area that contains an object selected after imaging and an area that contains another object, as well.

According to one aspect, the present invention provides an image processing apparatus configured to perform image processing for an input image generated through imaging, the image processing apparatus including one or more processors, and a memory storing instructions, which, when executed by the one or more processors, causes the one or more processors to perform operations of units of the image processing apparatus. The units include a parameter setting unit configured to set a first image processing parameter for each of a plurality of first object areas included in the input image, a processing unit configured to perform the image processing for the input image with a second image processing parameter set based on a plurality of first image processing parameters corresponding to the plurality of first object areas, and a selecting unit configured to select a second object area in the input image. The processing unit obtains information on a positional relationship between an object contained in the second object area and an object contained in the first object area, and sets the second image processing parameter based on the plurality of first image processing parameters and the information on the positional relationship.

Further features of the present invention will become apparent from the following description of exemplary embodiments with reference to the attached drawings.

DESCRIPTION OF THE EMBODIMENTS

Referring now to the accompanying drawings, a description will be given of embodiments of this embodiment.

First Embodiment

Figure 1:
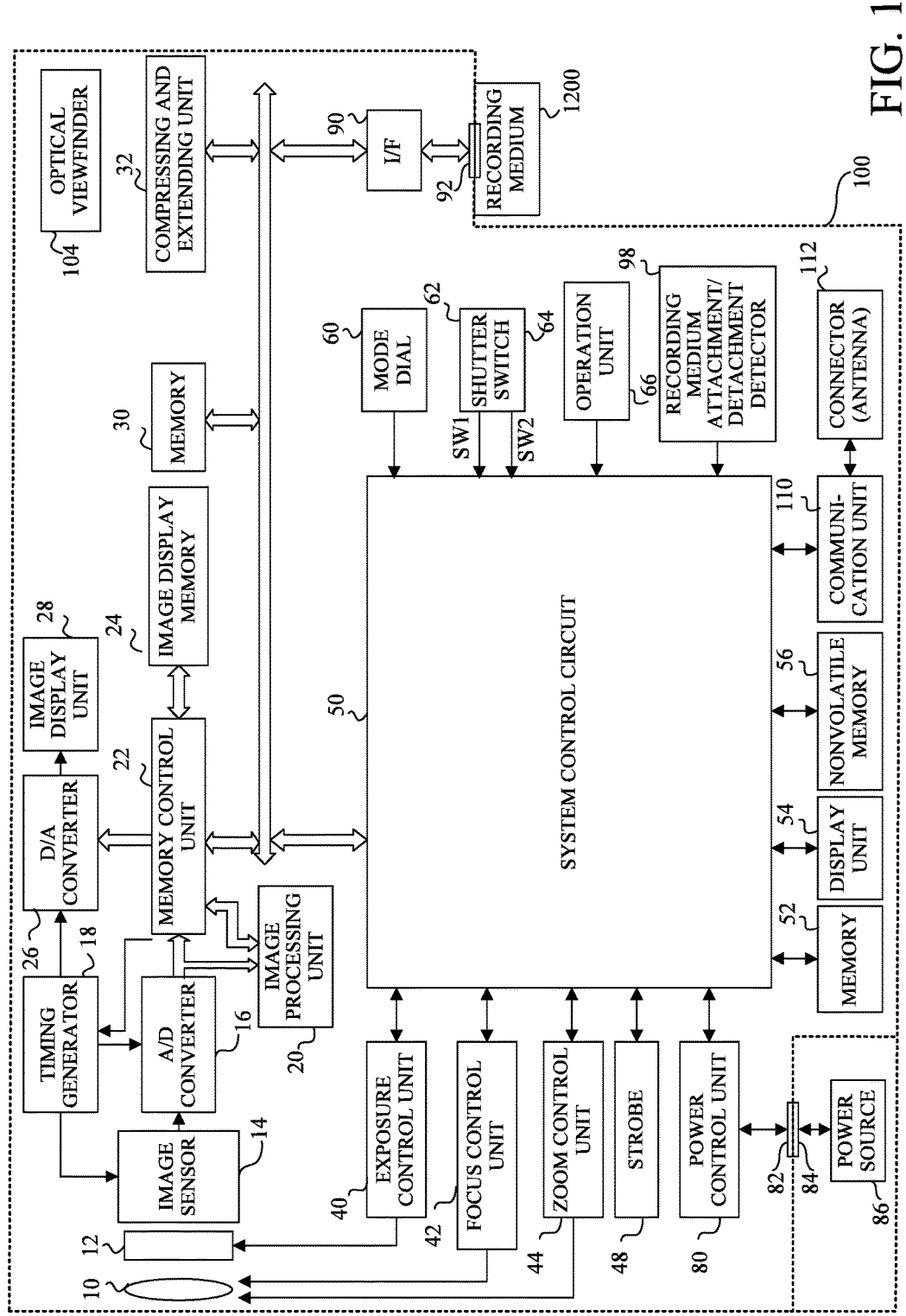
FIG. 1 is a block diagram of a configuration of an imaging apparatus according to one embodiment of the present invention.

FIG. 1 illustrates a configuration of an imaging apparatus (referred to as a "camera" hereafter) 100 according to this embodiment of the present invention. Reference numeral 10 denotes an imaging or image capturing lens as an imaging optical system. Reference numeral 12 denotes a shutter having a stop (or diaphragm) function. Reference numeral 14 denotes an image sensor that converts an optical image of an object formed by the imaging lens, into an electrical signal, and is configured as a CMOS sensor in this embodiment. Reference numeral 16 denotes an analog/digital (A/D) converter that converts an analog output signal from each pixel on the image sensor 14 into a pixel signal as a digital signal.

Reference numeral 18 denotes a timing generator that supplies a clock signal and a control signal to the image sensor 14, the A/D converter 16, and a digital/analog (D/A) converter 26. The timing generator 18 is controlled by a memory control unit 22 and a system control unit 50.

Reference numeral 20 denotes an image processing unit that performs image processing, such as a pixel interpolation process and a color conversion process, for a pixel signal from the A/D converter 16 and image data from the memory control unit 22. The image processing unit 20 performs a predetermined calculation process using image data generated by imaging, and supplies the calculation result to the system control unit 50. The system control unit 50 makes an exposure control unit 40 perform an auto-exposure (AE) process and flash pre-emission (EF) process based on the calculation result from the image processing unit 20, and performs the following refocus process and an auto white balance (AWB) process. The image processing unit 20 and the system control unit 50 constitute an image processing apparatus.

The memory control unit 22 controls the A/D converter 16, the timing generator 18, the image processing unit 20, the image display memory 24, the D/A converter 26, a memory 30, and a compressing and decompressing unit. The pixel data output from the A/D converter 16 is supplied to the memory control unit 22 via the image processing unit 20 or directly, and is written in the image display memory 24 or the memory 30.

Reference numeral 28 denotes an image display unit, such as a thin-film-transistor liquid crystal display (TFT-LCD). The image data used for display written in the image display memory 24 is supplied to the image display unit 28 via the D/A converter 26, and the image is displayed on the image display unit 28. The image display unit 28 displays the image data sequentially generated by live-view imaging (viewfinder imaging) so as to realize the electronic viewfinder function. In addition, a variety of display functions can be implemented, such as a reproduction display function, with the image display unit 28.

The memory 30 stores image data, such as a still image and a motion image obtained by this imaging (imaging for recording). The memory 30 can also be utilized as a work area for the system control unit 50.

The compressing and decompressing unit 32 compresses or decompresses image data, such as adaptive discrete cosine transform (ADCT). The compressing and decompressing unit 32 reads image data stored in the memory 30, performs a compression or decompression process, and writes processed image data in the memory 30.

An exposure control unit 40 controls the shutter 12 and the strobe (illumination unit) 48 so as to adjust strobe light. A focus control unit 42 provides focusing by controlling driving of a focus lens in the imaging lens 10. Reference numeral 44 is a zoom control unit configured to control driving of a magnification-varying lens in the imaging lens 10. Reference numeral 46 denotes a barrier control unit configured to control an operation of a barrier 102 that protects the imaging lens 10.

The system control unit 50 controls an operation of the entire camera 100. Reference numeral 52 denotes a memory that stores an operating constant, a variant, a program, etc. of the system control unit 50. A memory 52 stores a program chart used for the AE.

Reference numeral 54 denotes a display unit including a liquid crystal display device, a speaker, etc., and is provided to a top of the camera 100 or in the optical viewfinder 104. The display unit 54 provides a user with various information through a letter, an image, and a voice according to a display signal from the system control unit 50. The user can view information displayed on the display unit 54 in the optical viewfinder 104 while confirming the object through the optical viewfinder 104.

Reference numeral 56 denotes an electrically erasable and recordable, nonvolatile memory, such as an electrically erasable programmable read-only memory (EEPROM). Reference numerals 60, 62, 64, and 66 are operating units configured to input a variety of commands into the system control unit 50 when operated by the user, and include a switch, a dial, a touch panel, a visible line sensor, and a voice recognition unit. Reference numeral 60 denotes a mode dial switch that commands a setting of an imaging mode according to the dial position. Reference numeral 62 denotes a first shutter switch (SW1) that turns on when an unillustrated shutter button is half-pressed and commands a start of the AE process, the AE process, the AWB process, the EF process, etc. Reference numeral 64 denotes a second shutter switch (SW2) that turns on when the shutter button is fully pressed and commands an imaging start. Reference numeral 66 denotes an operating unit configured to command another operation.

Reference numeral 80 denotes a power control unit that converts a voltage from a power source (battery) 86 into a necessary voltage and supplies the voltage to each component. Reference numerals 82 and 94 denote connectors. Reference numeral 90 denotes an interface with a recording medium 1200, such as a memory card and a hard disk drive. Reference numeral 98 denotes a recording medium attachment/detachment detector configured to detect an attachment of the recording medium 1200 into the camera 100.

Reference numeral 110 denotes a communication unit that communicates with another device through a wired communication via an unillustrated cable or a wireless communication via an antenna 112.

Figure 2:
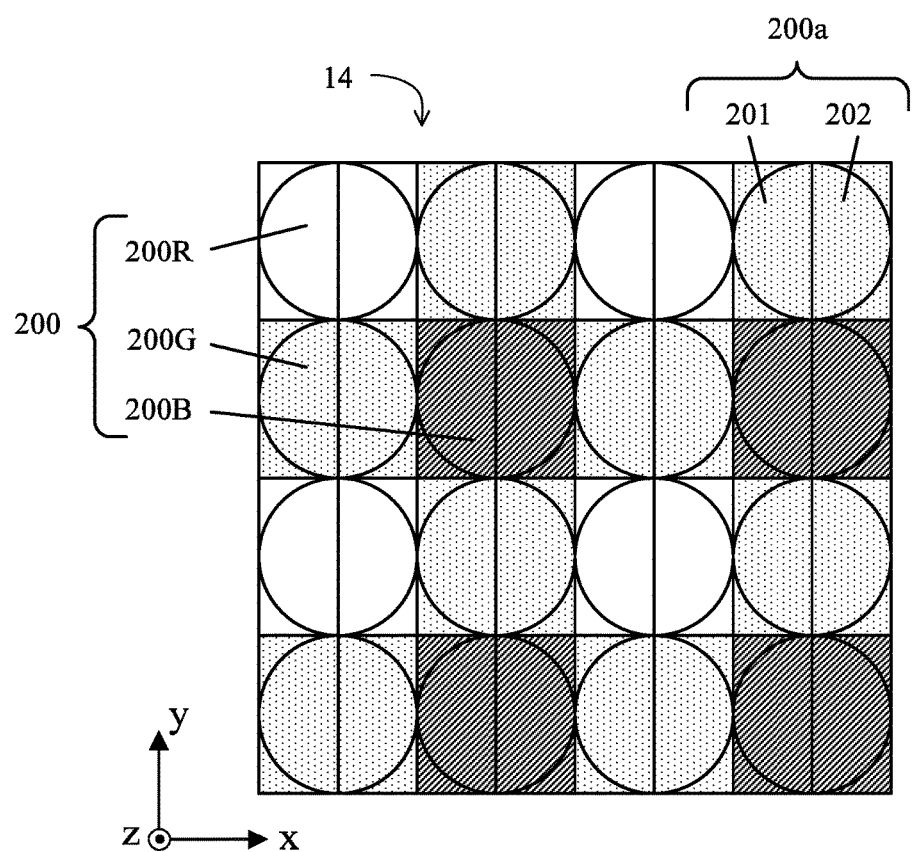
FIG. 2 illustrates a configuration of an imaging unit in the imaging apparatus according to this embodiment.

FIG. 2 illustrates a pixel arrangement on the image sensor 14 according to this embodiment. FIG. 2 illustrates an arrangement of imaging pixels in a 4×4 range in the CMOS sensor. A pixel unit 200 includes 2×2 imaging pixels, such as a pixel 200R having a spectral sensitivity of red (R) disposed on the upper left part, a pixel 200G having a spectral sensitivity of green (G) disposed on the upper right part and the lower left part, and a pixel 200B having a spectral sensitivity of blue (B) disposed on the lower right part. Moreover, each imaging pixel 200a includes 2×1 (or a pair of) first subpixel 201 and second subpixel 202. In other words, each of the first and second subpixels 201 and 202 constitutes a focus detecting pixel, and FIG. 2 illustrates an arrangement of focus detecting pixels in an 8×4 range. The image sensor 14 includes many imaging pixels and pairs of subpixels on the imaging plane, and can acquire an imaging signal for generating a captured image and a focus detecting signal used for a focus detection.

While FIG. 2 illustrates a horizontal arrangement of the pair of subpixels 201 and 202 by horizontally dividing the exit pupil (or by the pupil division) into two, the pupil may be divided in the vertical direction. In order to divide the exit pupil both in the horizontal and vertical directions, a plurality of subpixels may be arranged both in the column direction and in the row direction. As described later, this embodiment uses signal outputs from these subpixels to reconstruct (generate) the image (refocus image) in which a focus position is artificially moved.

While each imaging pixel contains a pair of subpixels in this embodiment, the imaging pixel and a pair of subpixels may be configured to be separate pixels. The focus detecting pixels as pairs of subpixels may be partially (discretely) arranged in the plurality of imaging pixels.

Figure 3:
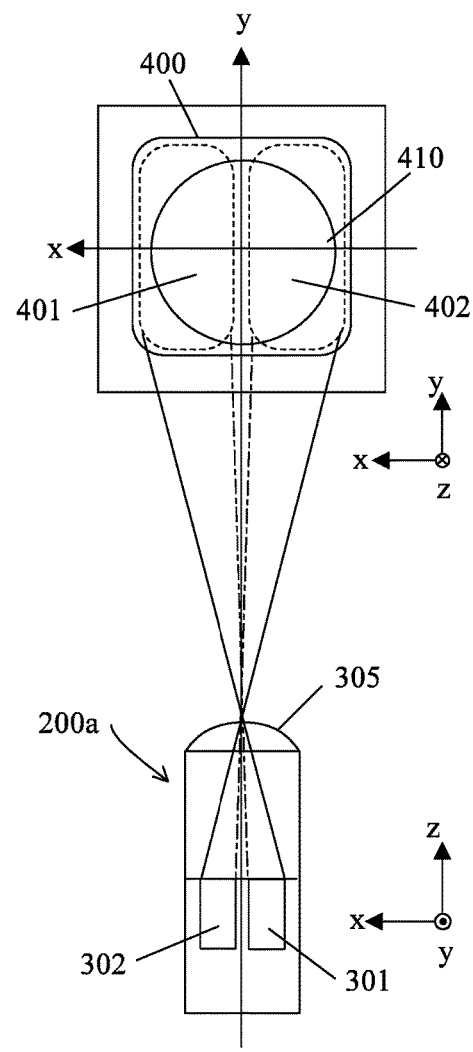
FIG. 3 illustrates a relationship between pixels on an image sensor and an exit pupil according to this embodiment.
Figure 4:
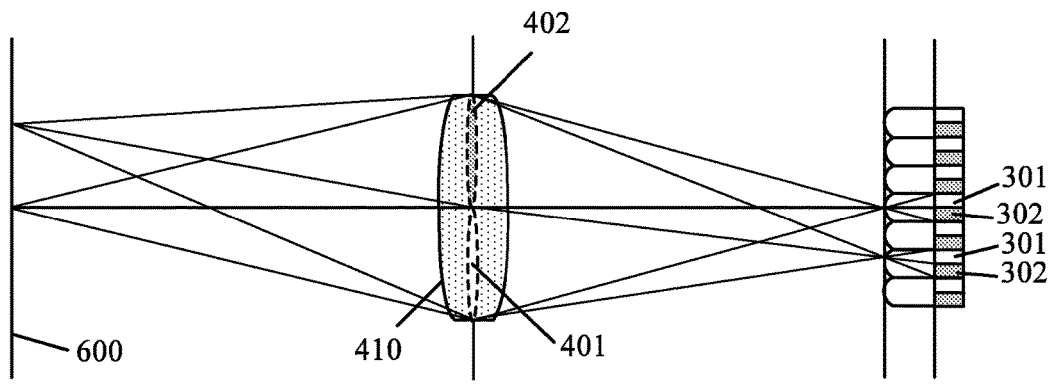
FIG. 4 illustrates an imaging optical system and a pupil division in the imaging apparatus according to this embodiment.

A bottom of FIG. 3 illustrates an xz section of one imaging pixel 200a on the image sensor 14 illustrated in FIG. 2 in which a direction along the optical axis in the imaging lens 10 is set to the z direction. A top of FIG. 3 illustrates a surface (exit pupil plane) on which an exit pupil 410 in the imaging lens 10 is formed. FIG. 3 illustrates the exit pupil plane in a different orientation of the imaging pixel 200a so as to set the z direction to the vertical direction, relative to the paper plane. FIG. 4 illustrates a section of the exit pupil 410 and the image sensor 14 taken along the z direction and FIG. 3, and the pupil division by a micro lens 305, which will be described later. In FIG. 4, reference numeral 600 denotes an object plane.

The micro lens 305 condenses incident light on the light incident side of the imaging pixel 200a. The imaging pixel 200a includes photoelectric converters 301 and 302, which are divided into two in the x direction. These photoelectric converts 301 and 302 correspond to the first subpixels 201 and second subpixels 202 in FIG. 2. An unillustrated color filter, which transmits only the R, G, and B light fluxes, is provided between the micro lens 305 and the photoelectric converters 301 and 302 in the imaging pixel 200a. The light incident on the imaging pixel 200a is condensed by the micro lens 305, separated by the color filter 306, and received by the photoelectric converts 301 and 302. The photoelectric converters 301 and 302 accumulate the electrical charges due to its photoelectric conversion actions. The electrical charges accumulated by each photoelectric converter are converted into the voltage signal and output as the subpixel signal.

As illustrated in FIG. 3, the photoelectric converter 301 having a center of gravity biasing in the negative x direction and the first pupil region 401 on the positive x side of the pupil plane surface are approximately conjugate with each other by the micro lens 305 in the imaging pixel 200a. Thus, the photoelectric converter 301 receives light that has passed the first pupil region 401. The photoelectric converter 302 having a center of gravity biasing in the positive x direction and the second pupil region 402 on the negative x side on the exit pupil plane are approximately conjugate with each other by the micro lens 305 in the imaging pixel 200a. Thus, the photoelectric converter 302 receives light that has passed the second pupil region 402. A whole imaging pixel 200G that includes the photoelectric converters 301 and 302 can receive light that has passed the whole pupil region 400 that contains the first and second pupil regions 401 and 402 on the exit pupil plane.

The photoelectric converters 301 and 302 that are different from each other receive light fluxes that have passed the first pupil region 401 and the second pupil region 402 that are different pupil regions from each other in the exit pupil 410 and have entered each imaging pixel at a different angle. This configuration provides the pupil division. The image sensor of this embodiment provides a pupil division in the horizontal direction (x direction), but the image sensor may provide the pupil division in the vertical direction (y direction).

The image sensor 14 that provides the pupil division for each imaging pixel 200a generates a first focus detecting signal by collecting subpixel signals from the photoelectric converters 301 (first subpixels 201) in the plurality of imaging pixels 200a. The subpixel signals from the photoelectric converters 302 (second subpixel 202) in a plurality of imaging pixels 200a are collected and used to generate a second focus detecting signal. Moreover, the image signal for generating an image having a resolution of an effective pixel number N is generated by adding output signals from the first and second subpixels 201 and 202 for each imaging pixel 200a and collecting the added signals.

Figure 5:
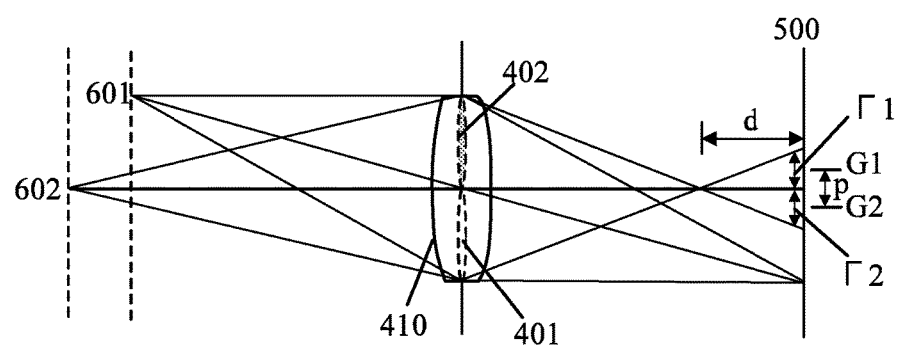
FIG. 5 illustrates a relationship between an image shift amount obtained from an output signal from the image sensor and a defocus amount.

Referring now to FIG. 5, a relationship will be described of a shift amount between the first and second focus detecting signals obtained from the image sensor 14 and a defocus amount of the imaging lens 10. Reference numeral 500 illustrates an imaging plane as a light receiving plane of the image sensor 14. The pupil division described with reference to FIGS. 3 and 4 divides the exit pupil 410 in the imaging lens 10 into two or the first pupil region 401 and the second pupil region 402.

A code of the defocus amount d is defined such that a front focus state is negative (d<0) when the imaging position is closer to the object side than the imaging plane 500, and a back focus state is positive (d>0) when the imaging position is closer to the side opposite to the object side of the imaging plane 500, where |d| is a distance from the imaging position of the light from the object to the imaging lane 500. The defocus amount d is 0 in the in-focus state where the imaging position of the light from the object is located on the imaging plane 500. FIG. 5 illustrates the imaging lens 10 focused on an object plane 601, and a front focus state to an object plane 602. The front focus state and the back focus state will be collectively referred to as a defocus state.

In the front focus state, a first light flux that has passed the first pupil region 401 in the light from the object plane 602 spreads with a width Γ1 around a center of gravity position G1 as a center of the first light flux after the first light flux is once condensed and forms a blurred object image on the imaging plane 500. A second light flux that has passed the second pupil region 402 in the light from the object plane 602 spreads with a width Γ2 around a center of gravity position G2 as a center of the second light flux after the second light flux is once condensed and forms a blurred object image on the imaging plane 500. These blurred object images are received by a plurality of first subpixels 201 and a plurality of second subpixels 202. Thus, the subpixel signals output from the plurality of first subpixels 201 and the plurality of second subpixels 202 form the first focus detecting signal and the second focus detecting signal.

The first focus detecting signal and the second focus detecting signal are signals indicative of an object image formed at the center of gravity positions G1 and G2 on the imaging plane 500 by the light from the object plane 602 and blurred with the blur widths Γ1 and Γ2. In addition, a shift amount p between the first focus detecting signal and the second focus detecting signal (which is a distance G1-G2 of the center of gravity positions of the first and second light fluxes and will be referred to as an "image shift amount" hereafter) approximately proportionally increases as the defocus amount d increases. While a direction (positive direction) in which the image shift amount between the first and second focus detecting signals increases in the back focus state (D>0) is opposite to a direction (negative direction) in which the image shift amount increases in the front focus state, the image shift amount increases as the defocus amount d (absolute value) increases. Thus, a defocus amount of the imaging lens 10 can be calculated based on the image shift amount (phase difference) between the first and second focus detecting signals.

Figure 6:
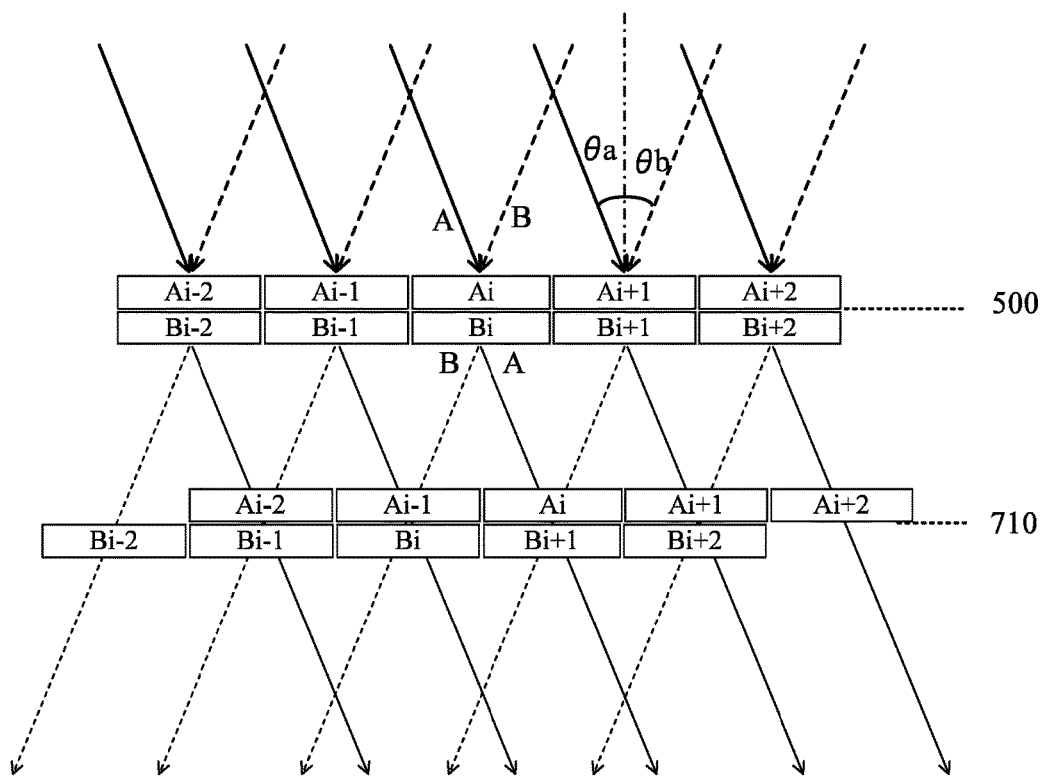
FIG. 6 is a view for explaining a refocus process according to this embodiment.

Referring now to FIG. 6, a description will be given of a refocus process performed by the image processing unit 20. The image processing unit 20 performs the refocus process based on subpixel signals corresponding to the first and second subpixels 201 and 202 for imaging from different viewpoints in the captured image obtained with the image sensor 14. More specifically, the image processing unit 20 relatively shifts and adds these subpixel signals in accordance with pixel arrangement on the focus plane (reconstruction surface) at the focus position corresponding to the refocus image to be generated. In other words, a plurality of parallax images having a parallax obtained by imaging from different viewpoints are shifted and combined so that the object areas to be focused can overlap each other. Thereby, a refocus image can be obtained with a high in-focus degree at an arbitrary focus position.

FIG. 6 illustrates, as a first subpixel signal Ai, a subpixel signal from the first subpixel 201 in the i-th imaging pixel in the column direction arranged on the imaging plane 500 on the image sensor 14. In addition, FIG. 6 illustrates, as a second subpixel signal Bi, a subpixel signal from the second subpixel 202 in the imaging pixel. The first subpixel signal Ai is a signal obtained by photoelectrically converting the light that has passed the pupil region 401 illustrated in FIGS. 4 and 5 and entered the i-th first subpixel 201 at a principal ray angle θa. The second subpixel signal Bi is a signal obtained by photoelectrically converting the light that has passed the pupil region 402 illustrated in FIGS. 4 and 5 and entered the i-th second subpixel 202 at a principal ray angle θb.

Each of the first subpixel signal Ai and the second subpixel signal Bi has information on the incident angle (θa, θb) as well as information of the intensity of the light (principal ray). Hence, the first subpixel signal Ai is parallel moved to a virtual imaging plane 710 in the direction of the incident angle θa, the second subpixel signal Bi is parallel moved to the virtual imaging plane 710 in the direction of the incident angle θb, and these signals are added to each other. Thereby, the refocus pixel signal can be generated as a pixel image on the virtual imaging plane 710.

Parallel moving the first subpixel Ai in the direction of the incident angle θa to the virtual imaging plane 710 corresponds to a shift of the first subpixel signal Ai by +0.5 pixels in the column direction. Parallel moving the second subpixel Bi in the direction of the incident angle θb to the virtual imaging plane 710 corresponds to a shift of the second subpixel signal Bi by −0.5 pixels in the column direction. Hence, the first subpixel signal Ai and the second subpixel signal Bi are relatively shifted by one pixel, and Ai and Bi+1 are added to each other so as to generate the refocus pixel signal on the virtual imaging plane 710. Similarly, the first subpixel signal Ai and the second subpixel signal Bi are shifted by an integer number of pixels and added to each other so as to generate a refocus pixel signal on the virtual imaging plane corresponding to the integer shift amount.

In the refocus process, a maximum shift amount value with which the refocus effect can be obtained or a refocusable range in which the refocus process is available changes depending on the parallax magnitude obtained by the image sensor 14. Hence, the shift amount may be controlled in the refocus process within the refocusable range by confirming the refocusable range.

A plurality of parallax images to be shifted and combined by the refocus process may be obtained by using a plurality of imaging apparatuses arranged at different positions (viewpoints).

Figure 7:
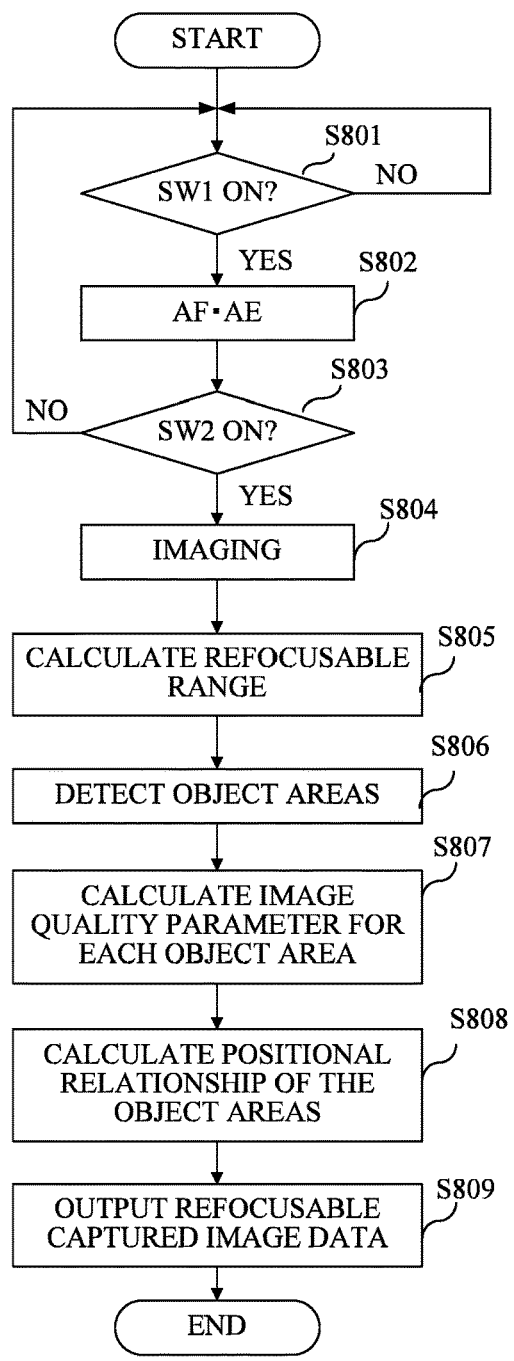
FIG. 7 is a flowchart of an imaging process according to this embodiment.

Referring now to a flowchart illustrated in FIG. 7, a description will be given of an imaging process performed by the system control unit 50. The system control unit 50 executes this process in accordance with an imaging process program as a computer program.

In step S801, the system control unit 50 stands by until the first shutter switch (SW1) 62 turns on and moves to step S802 when the SW1 turns on. The system control unit 50 makes the image sensor 14 perform live-view imaging, the image processing unit 20 sequentially generate live-view images based on the image signal from the image sensor 14, and the image display unit 28 sequentially display the live-view images.

In step S802, the system control unit 50 makes the exposure control unit 40 perform the AE process, and the focus control unit 42 perform the AF process. Then, the flow moves to step S803.

In step S803, the system control unit 50 moves to step S804 when the second shutter switch (SW2) 62 turns on, and returns to step S801 unless the SW2 is turned on.

In step S804, the system control unit 50 controls and makes the image sensor 14 and the shutter 12 perform main imaging and the image processing unit 20 generate captured image data (simply referred to as a "captured image" hereafter). The generated captured image is an image as a pixel image that includes the subpixel signals corresponding to the first and second subpixels 201 and 202 on the image sensor 14, and an image that enables a refocus image to be reconstructed or that can provide the refocus process. In other words, it is an image that can provide a plurality of parallax images to be shifted and combined in order to generate the refocus image.

Next, in step S805, the system control unit 50 calculates the refocusable range of the captured image obtained by the main imaging. The refocusable range may be calculated based on the parallax obtained by the image sensor 14 or based on the output size of the refocus image to be reconstructed.

Next, in step S806, the system control unit 50 detects an object in the captured image acquired by the main imaging, and sets the image area that contains detected object to an object area (first object area). The object may be detected in the whole captured image but the object is detected within the refocusable range in the captured image in this embodiment. The object, as used herein, is a human face or a body, a building, an animal, etc. Since a plurality of objects are detected in general imaging, this embodiment assumes that a plurality of object areas are set herein. Without detecting the object, an image area that contains a plurality of objects selected by the user may be set as a plurality of object areas.

Next, in step S807, the system control unit (parameter setting unit) 50 sets an image quality parameter as a first image processing parameter for each object area set in step S806. The image quality parameter is a parameter used for image processing that includes at least one of a white balance process (referred to as a "WB process" hereafter), a color conversion process, and a luminance process. In this embodiment, the image quality parameter is a parameter for the WB process. The image quality parameter for the object area is a parameter that improves the image quality of the object area that has experienced the image processing with this parameter. For example, where the object contained in the object area is a human face, it is a WB coefficient as the image quality parameter that improves the WB of the object area that contains the face.

Next, in step S808, the system control unit 50 calculates (obtains) information on the positional relationship among the objects for each of these object areas set in step S806. The information on the positional relationship contains information on the distance and relative position among the objects, for example, in the depth direction (in the imaging optical axis direction in the camera 100). In this case, the object may be properly set that is a reference object for the distance and the relative position. For example, the object focused by the AE process in imaging may be set to the reference object. The distance and the relative position in the depth direction may be calculated based on the defocus amount and the image shift amount as information on the focus state for each object or the defocus amount and the image shift amount may be replaced with information of the distance or relative position in the depth direction.

Finally, in step S809, the system control unit 50 makes the image processing unit 20 output the captured image for which the refocus process is available, and stores the captured image in the recording medium 1200 or the memory 30. This embodiment stores (records) the captured image correlated with the information on the image quality parameter for each object area set in step S807 and the positional relationship calculated in step S808, in the recording medium 1200.

Referring now to a flowchart illustrated in FIG. 8, a description will be given of the refocus process performed by the image processing unit 20. The image processing unit 20 serves as the image processing computer and executes this process in accordance with an image processing program as a computer program.

In step S901, the image processing unit 20 obtains the refocusable captured image stored in the recording medium 1200 or the memory 300 in step S809.

Next, in step S902, the image processing unit 20 outputs the display image generated with the captured image in the main imaging in step S804 and correlated with the captured image to the image display unit 28, and makes the image display unit 28 display the display image.

Next, in step S903, the image processing unit (selecting unit) 20 selects a specific object area (second object area) as an area to be newly focused in the following refocus process in the captured image, in accordance with the selecting operation by the user. More specifically, the user performs the selecting operation of the specific object area through the touch panel in the operating unit 66 while viewing the display image displayed on the image display unit 28 in step S902, and the image processing unit 20 sets (selects) the specific object area in accordance with this selecting operation. The image processing unit 20 sets the selected specific object area as the target refocus area in the next refocus process.

The specific object area may or may not be included in a plurality of object areas detected (set) in step S806 in the imaging process. Herein, assume that the specific object area is one of a plurality of object areas detected in the imaging process.

Next, in step S904, the image processing unit 20 calculates (sets) the image quality parameter as the second image processing parameter used for the WB process for the whole refocus image generated in the following refocus process. In the following description, the image quality parameter as the second image processing parameter will be referred to as a refocus image quality parameter.

Thereafter, the image processing unit 20 generates the refocus image focused on the distance of the target refocus area in step S905, and performs the WB process for the refocus image with the refocus image quality parameter set in step S904.

Figure 9A:
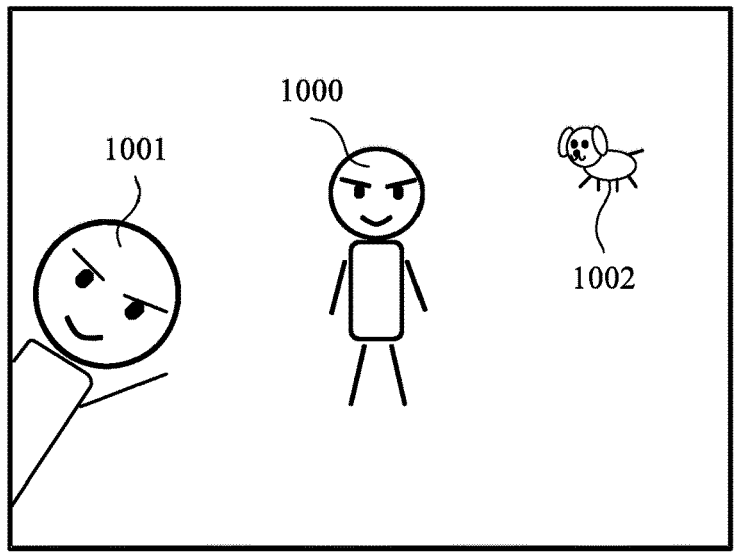
FIGS. 9A and 9B illustrate a positional relationship of an object after the refocus process according to this embodiment is performed.
Figure 9B:
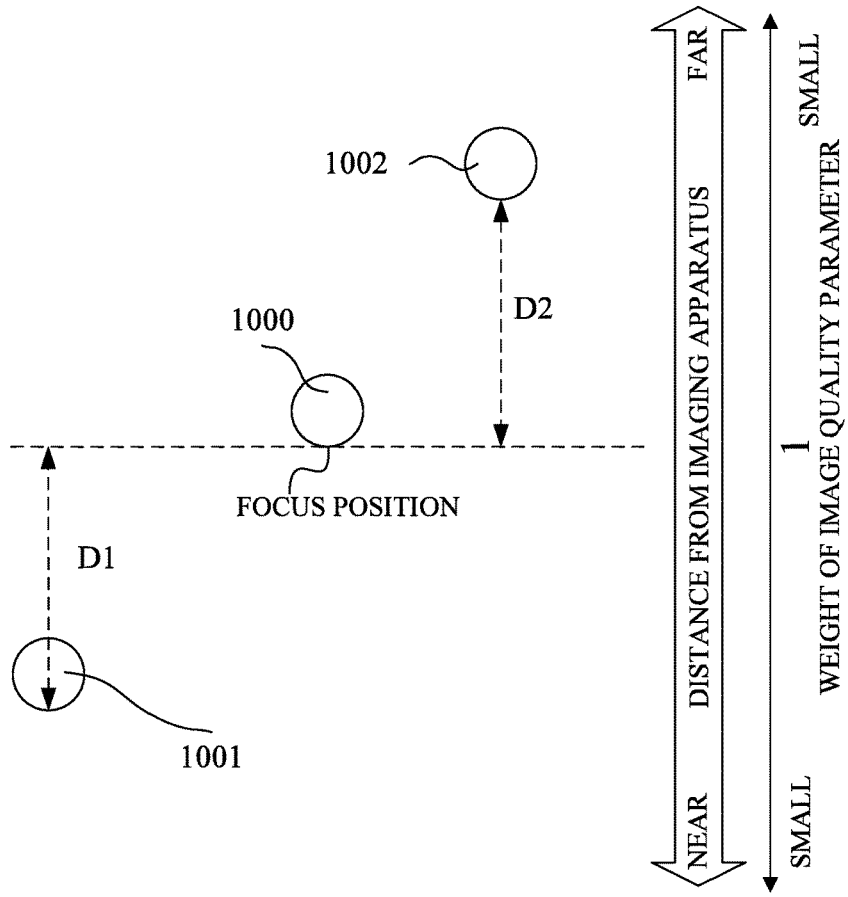

Referring now to FIGS. 9A and 9B, a description will be given of an illustrative calculating method of a refocus image quality parameter in step S904. The image quality parameter (first image processing parameter) for each object area correlated with the captured image data and stored in step S809 and the information on the positional relationship among the objects (which is directed to distance information herein) are used to calculate the refocus image quality parameter. This description assumes that the positional relationship means only the positional relationship in the depth direction as described above and does not contain the positional relationship on the image plane (or in the image). Alternatively, the refocus image quality parameter may be set based on the positional relationship among the objects on the image plane.

FIG. 9A illustrates a refocus image focused on a specific object 1000 generated by the refocus process using the captured image data and contained in a target refocus area (specific object area) among a plurality of objects 1000, 1001, and 1002. FIG. 9B illustrates a positional relationship among the objects 1000, 1001, and 1002. The object 1001 is distant from the specific object 1000 or the focus position by a distance D1 on a long-distance side, and the object 1002 is distant from the focus position by a distance D2 on a short-distance side. At this time, the refocus image quality parameter is calculated by weighted-averaging the image quality parameter for each of the object areas (1000, 1001, and 1002) stored in step S809 in accordance with the distance from the focus position or the positional relationship between the specific object and the other object. More specifically, as illustrated in FIG. 9B and the following expression, a weight at the focus position is set to a maximum value of 1 and the weight is made less than 1 as a distance from the focus position increases on the long-distance or short-distance side in the weight average.

Thus, the refocus image quality parameter for the whole refocus image can be set to the image quality parameter based on the image quality balance of the whole refocus image while the specific object area is highly considered. The refocus image quality parameter may be calculated based on the positional relationship among the objects in the image, similar to a calculation of the refocus image quality parameter according to the positional relationship in the depth direction. For example, distances among the centers of gravity in a plurality of object areas in the image may be calculated and the weight depending on the distance may be used for the calculation of the weighted average.

A depth-of-field range in the refocus image may be calculated and the refocus image quality parameter may be calculated only with the image quality parameter to the object area that contains the object in the depth-of-field range. This configuration can generate a refocus image with an image quality more suitable for the user.

Next, in step S906, the image processing unit 20 outputs the refocus image for display generated with the refocus image for recording in step S905 to the image display unit 28, and makes the image display unit 28 display the refocus image.

Next, in step S907, the image processing unit 20 determines whether or not there is a change command of the target refocus area or whether or not there is a regeneration command of the refocus image. If there is the change command, the flow returns to step S904, and, if there is not the change command, the flow moves to step S908.

In step S908, the image processing unit 20 determines whether or not the user provides an output command of the refocus image. If there is no output command, the flow returns to step S907, and, if there is the output command, the flow moves to step S909.

In step S909, the image processing unit 20 outputs and stores, in the recording medium 1200, the WB-processed refocus image as the output image.

Figure 8:
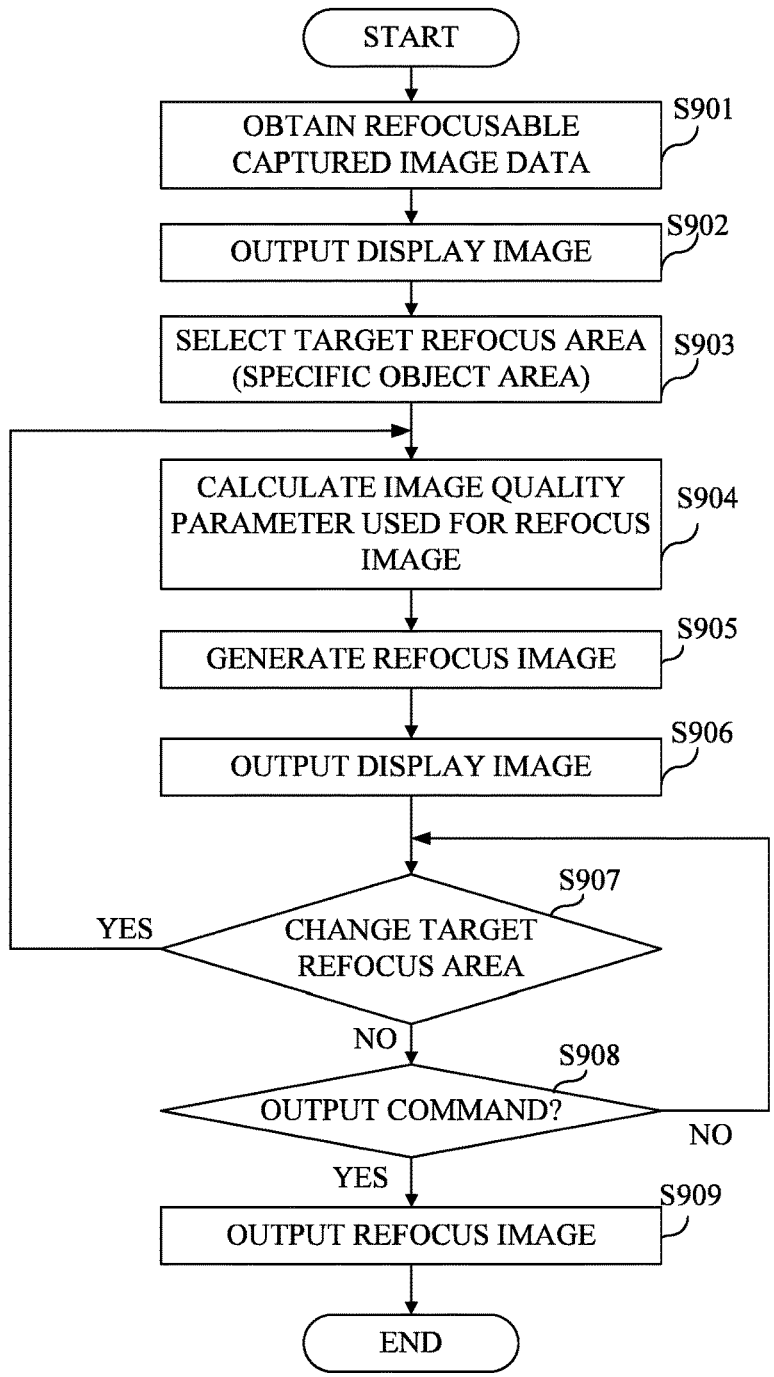
FIG. 8 is a flowchart of a refocus process according to this embodiment.

This embodiment previously calculates information on the image quality parameter and the positional relationship among the objects for each object area used for refocus process in the imaging process in FIG. 8 before the refocus process illustrated in FIGS. 9A and 9B is performed, correlates the information with the captured image data, and stores the information. This configuration can reduce a recalculation amount in the refocus process whenever the target refocus area is changed. Alternatively, the information on the image quality parameter and the positional relationship may be calculated in the refocus process.

While this embodiment calculates the positional relationship among the objects in the depth direction based on the defocus amount and the image shift amount, another method that does not use the focus amount or the image shift amount may be used to obtain the positional relationship. For example, distance information may be simply calculated based on a ratio of each object to the whole captured image and the positional relationship may be obtained. More specifically, where the object area is a face area, the distance may be simply estimated based on the ratio of the face area size.

As described above, the specific object area may not be contained in the plurality of object areas detected in the imaging process. In this case, the weighted average may maximize the weight for the image quality parameter set with the image quality parameter for the object area that includes the object having a predetermined positional relationship with the specific object in the specific object area among the plurality of specific object areas. The object having the predetermined positional relationship with the specific object may include an object closest to the specific object, the objects sandwiching the specific object, etc. The image quality parameter for the object area that contains the object closest to the specific object may be directly used for or may be corrected and then used for the image quality parameter for the specific object area. In addition, the image quality parameter for the specific object area may be set through an interpolation process that uses the image quality parameters for two object areas that contain the objects sandwiching the specific object.

Modification

The above embodiment sets the image quality parameter for each object area when the refocus image is processed. Alternatively, when the captured image (input image) other than the refocus image is processed, the image quality parameter may be set for each object area. In this case, the specific object area may be set to an area that contains the specific object selected as a user addressed object. This modification performs image processing that weights the user addressed object and improves the image qualities of other objects, and can generate a high-quality captured image (output image) that wholly reflects the user's intension.

While the above embodiment installs the system control unit 50 and the image processing unit 20 that constitute the image processing apparatus in the camera 100, the image processing apparatus may be configured separately from the imaging apparatus. In this case, the image processing apparatus configured as a personal computer, etc., may receive the captured image data from the imaging apparatus via the communication or the recording medium.

Other Embodiments

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus configured to perform image processing for an input image generated through imaging, the image processing apparatus comprising:
   (A) a memory that stores instructions; and
   (B) one or more processors that execute the instructions stored in the memory to function as:
      (a) a parameter setting unit configured to set a first image processing parameter for each of a plurality of first object areas included in the input image;
      (b) a processing unit configured to perform the image processing for the input image with a second image processing parameter set based on a plurality of first image processing parameters corresponding to the plurality of first object areas; and
      (c) a selecting unit configured to select a second object area in the input image,
      wherein the processing unit obtains information on a positional relationship between an object contained in the second object area and an object contained in the first object area, and sets the second image processing parameter based on the plurality of first image processing parameters and the information on the positional relationship,
      wherein the memory stores the first image processing parameters, set by the parameter setting unit, based on the captured image, and the information on the positional relationship acquired by the processing unit, and
      wherein the processing unit performs the image processing based on the first image processing parameter and the information on the positional relationship, which are stored in the memory.

2. The image processing apparatus according to claim 1, wherein the plurality of first object areas include the second object area, and
   wherein the processing unit:

(i) sets a maximum weight to the first image processing parameter for the first object area corresponding to the second object area;
(ii) sets a weight, different from the maximum weight according to the positional relationship to the first imaging processing parameter for the first object areas other than the second object area;
(iii) weighted-averages the first image processing parameters for the plurality of first object areas; and
(iv) sets the second image processing parameter.

3. The image processing apparatus according to claim 1, wherein the one or more processors further execute the instructions to function as (d) a detecting unit configured to detect an object area in the input image, and
wherein the parameter setting unit sets the first image processing parameter for each of the first object areas detected by the detecting unit.

4. The image processing apparatus according to claim 1, wherein the image processing includes a refocus process, and
wherein the selecting unit selects the second object area as an object area to be focused in the refocus process.

5. The image processing apparatus according to claim 4, wherein the input image is an image that provides a plurality of parallax images having parallaxes from the input image.

6. The image processing apparatus according to claim 4, wherein the input image is an image generated by an image sensor having a plurality of pixels, each of which photoelectrically converts light that has passed a different pupil region in an exit pupil in an imaging optical system.

7. The image processing apparatus according to claim 1, wherein the positional relationship includes a positional relationship in a depth direction.

8. The image processing apparatus according to claim 7, wherein the positional relationship includes a positional relationship on an image plane.

9. The image processing apparatus according to claim 1, wherein the processing unit acquires the information on the positional relationship based on information on a focus state in the imaging.

10. The image processing apparatus according to claim 1, wherein the processing unit acquires the information on the positional relationship based on a ratio of each of a size of the first object area to the input image and a ratio of the second object area to the input image.

11. The image processing apparatus according to claim 1, wherein the processing unit acquires a depth-of-field range in the input image, and sets the second image processing parameter based on the first image processing parameter set for the first object area contained in the depth-of-field range.

12. The image processing apparatus according to claim 1, wherein the image processing is at least one of a white balance process, a color conversion process, and a luminance process.

13. An imaging apparatus comprising:
(A) an image sensor configured to capture an optical image, formed by light from an object; and
(B) an image processing apparatus configured to perform image processing for a captured image generated based on one of an output signal from the image sensor and an input image generated based on the captured image, the image processing apparatus including:
(a) a memory that stores instructions; and
(b) one or more processors that execute the instructions stored on the memory to function as:
(i) a parameter setting unit configured to set a first image processing parameter for each of a plurality of first object areas included in the input image;
(ii) a processing unit configured to perform the image processing for the input image with a second image processing parameter set based on a plurality of first image processing parameters corresponding to the plurality of first object areas; and
(iii) a selecting unit configured to select a second object area in the input image,
wherein the processing unit obtains information on a positional relationship between an object contained in the second object area and an object contained in the first object area, and sets the second image processing parameter based on the plurality of first image processing parameters and the information on the positional relationship,
wherein the memory stores the first image processing parameters, set by the parameter setting unit, based on the captured image, and the information on the positional relationship acquired by the processing unit, and
wherein the processing unit performs the image processing based on the first image processing parameter and the information on the positional relationship, which are stored in the memory.

14. The imaging apparatus according to claim 13, wherein the image processing is at least one of a white balance process, a color conversion process, and a luminance process.

15. An image processing method configured to perform image processing for an input image generated through imaging, the image processing being executed by one or more processors executing instructions stored in a memory to perform the steps of:
setting a first image processing parameter for each of a plurality of first object areas included in the input image;
performing the image processing for the input image with a second image processing parameter set based on a plurality of first image processing parameters corresponding to the plurality of first object areas;
selecting a second object area in the input image;
obtaining information on a positional relationship between an object contained in the second object area and an object contained in the first object area and setting the second image processing parameter based on the plurality of first image processing parameters and the information on the positional relationship,
wherein the memory stores the first image processing parameters, set in the step of setting the first image processing parameters, based on the input image, and the information on the positional relationship, obtained in the step of performing the image processing, and
wherein the image processing is performed based on the first image processing parameter and the information on the positional relationship, which are stored in the memory.

16. The image processing method according to claim 15, wherein the image processing is at least one of a white balance process, a color conversion process, and a luminance process.

17. A non-transitory computer-readable storage medium storing an image processing program that enables a computer to execute an image processing method configured to perform image processing for an input image generated through imaging, and executed by one or more processors executing instructions stored in a memory to perform the steps of:
- setting a first image processing parameter for each of a plurality of first object areas included in the input image;
- performing the image processing for the input image with a second image processing parameter set based on a plurality of first image processing parameters corresponding to the plurality of first object areas;
- selecting a second object area in the input image;
- obtaining information on a positional relationship between an object contained in the second object area and an object contained in the first object area; and
- setting the second image processing parameter based on the plurality of first image processing parameters and the information on the positional relationship,
- wherein the memory stores the first image processing parameters, set in the step of setting the first image processing parameters, based on the input image, and the information on the positional relationship, obtained in the step of performing the image processing, and
- wherein the image processing is performed based on the first image processing parameter and the information on the positional relationship, which are stored in the memory.

18. The non-transitory computer-readable storage medium according to claim 17, wherein the image processing is at least one of a white balance process, a color conversion process, and a luminance process.

* * * * *